(12) United States Patent
Inomata

(10) Patent No.: US 9,928,650 B2
(45) Date of Patent: Mar. 27, 2018

(54) COMPUTER PROGRAM FOR DIRECTING LINE OF SIGHT

(71) Applicant: COLOPL, INC., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/263,151

(22) Filed: Sep. 12, 2016

(65) Prior Publication Data

US 2017/0076497 A1   Mar. 16, 2017

(30) Foreign Application Priority Data

Sep. 14, 2015   (JP) .................................. 2015-181073

(51) Int. Cl.
| | |
|---|---|
| *G06T 19/00* | (2011.01) |
| *G06F 3/0346* | (2013.01) |
| *G06F 3/01* | (2006.01) |
| *G06F 3/0481* | (2013.01) |

(52) U.S. Cl.
CPC ............ *G06T 19/003* (2013.01); *G06F 3/012* (2013.01); *G06F 3/0346* (2013.01); *G06F 3/04815* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,200,138 B1 * | 3/2001 | Ando ..................... | A63F 13/10 273/148 B |
| 6,597,380 B1 | 7/2003 | Wang et al. | |
| 2015/0352437 A1 * | 12/2015 | Koseki ................. | A63F 13/212 463/31 |

FOREIGN PATENT DOCUMENTS

JP              11-265462 A      9/1999

\* cited by examiner

*Primary Examiner* — Nicholas R Wilson
(74) *Attorney, Agent, or Firm* — Hauptman Ham, LLP

(57) ABSTRACT

A non-transitory computer readable medium for storing instructions for directing a line of sight by causing a computer that is connected to a head-mounted display to identify a position of a target object in a three-dimensional virtual space. The computer is further caused to determine a field of view that is based on the line of sight from a virtual camera, in relation to movement of the HMD. The computer is further caused to place a guiding object, which follows the line of sight, in the three-dimensional virtual space at a point in the field of view that is determined based on a position of the virtual camera, a direction of the line of sight, and the position of the target object. The computer is further configured to generate instructions for displaying a field-of-view image of the three-dimensional virtual space including the guiding object.

18 Claims, 12 Drawing Sheets

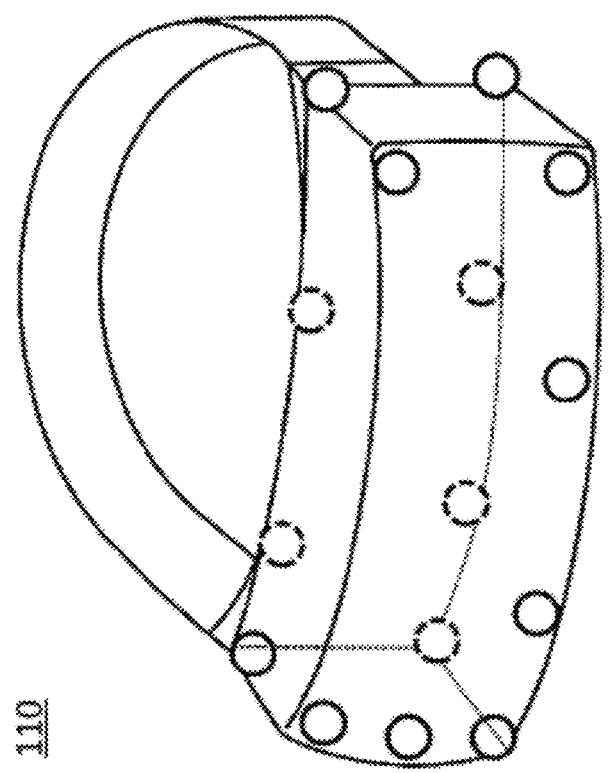

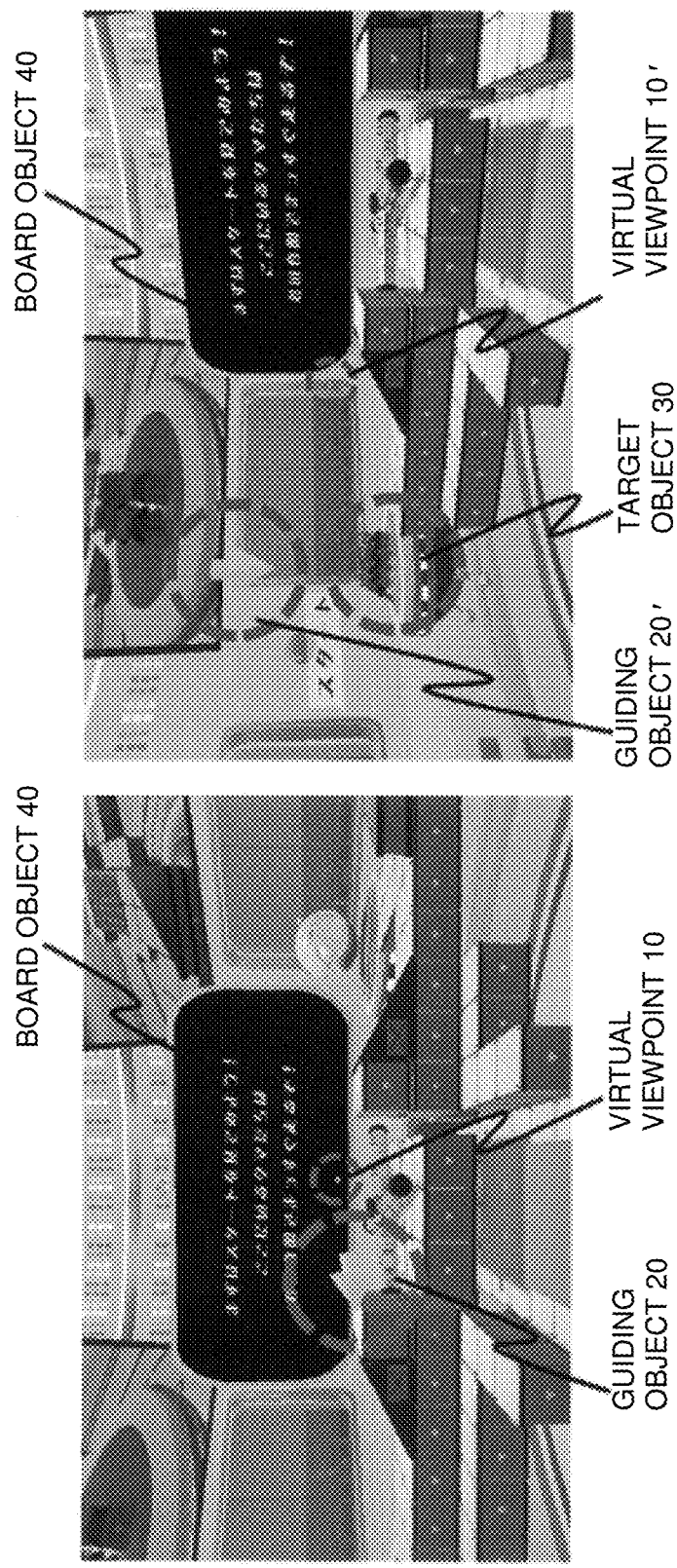

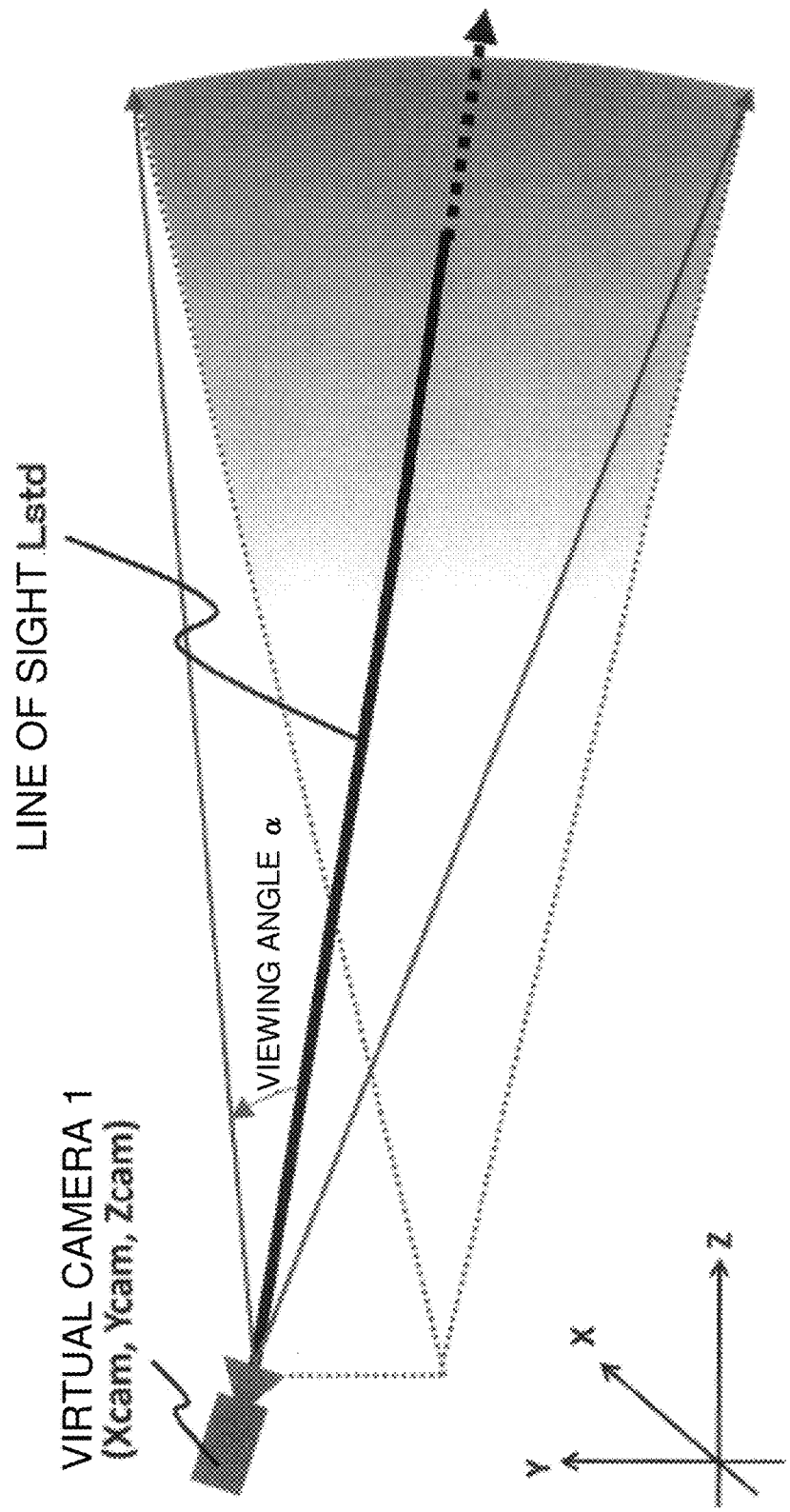

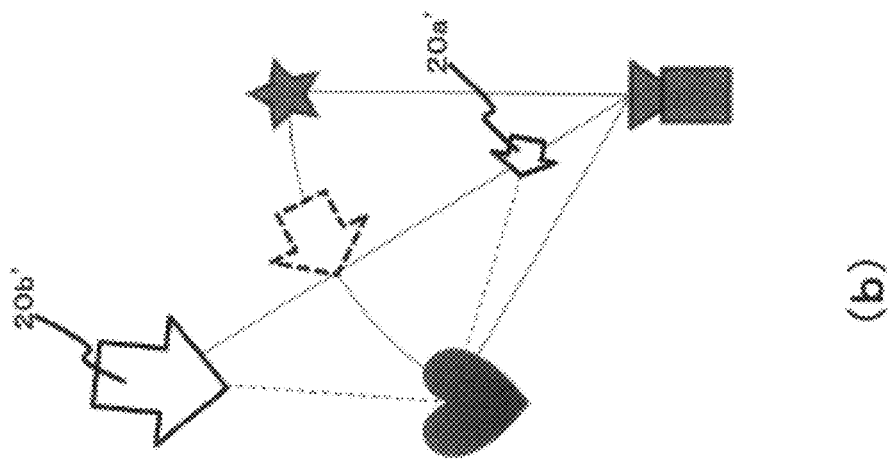
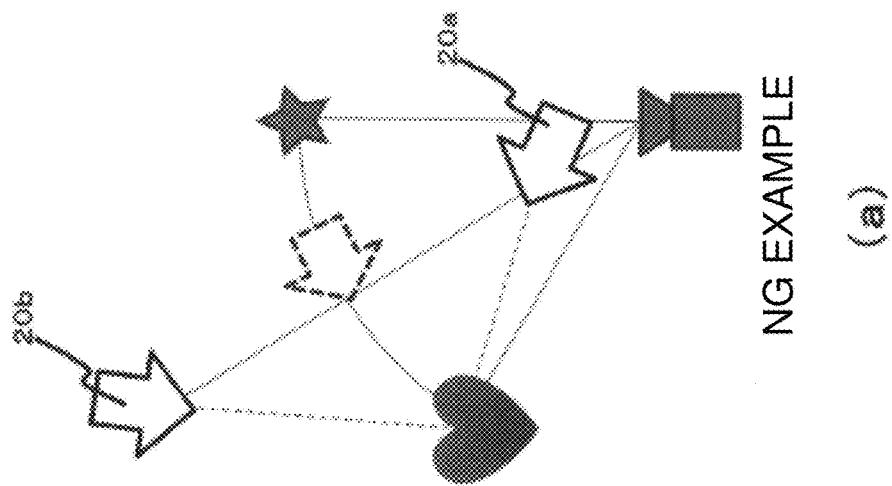
FIG. 6B

FIG. 7A
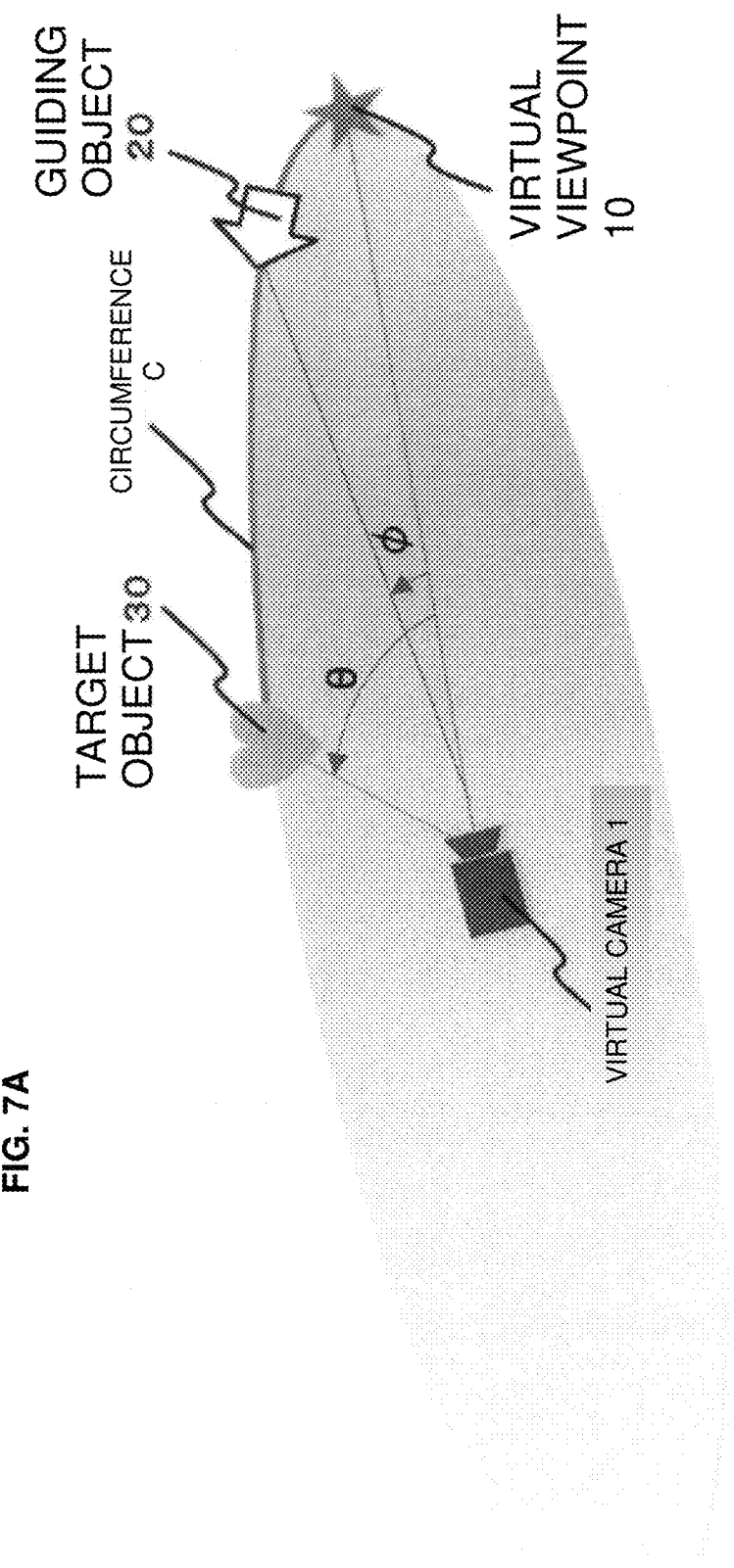
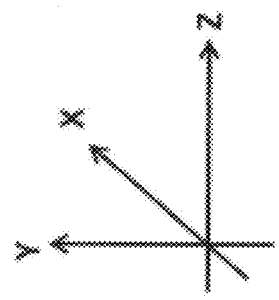

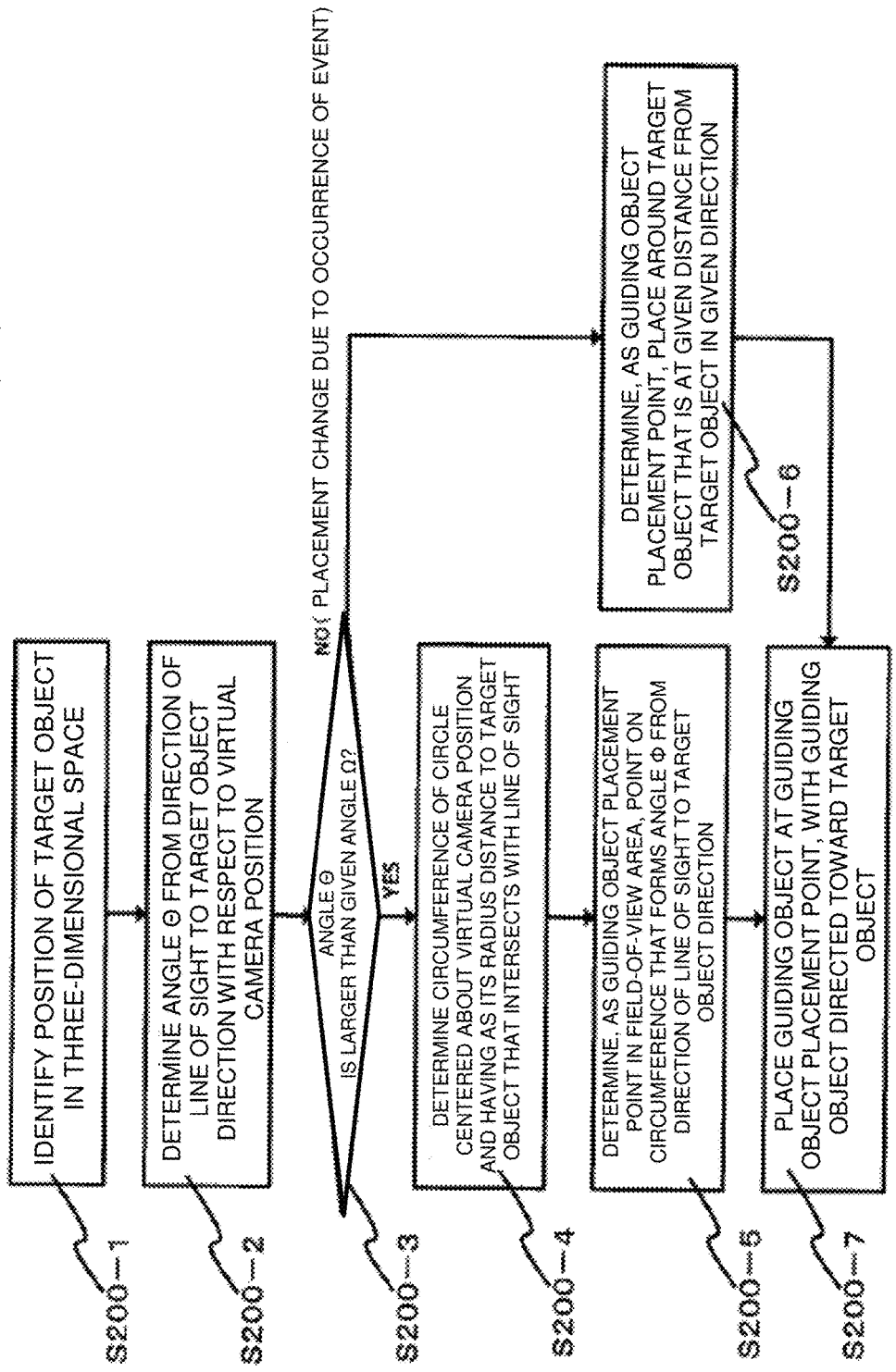

COMPUTER PROGRAM FOR DIRECTING LINE OF SIGHT

RELATED APPLICATIONS

The present application claims priority to Japanese Application Number 2015-181073, filed Sep. 14, 2015, the disclosure of which is hereby incorporated by reference herein in its entirety.

BACKGROUND

This disclosure relates to a computer program. More particularly, this disclosure relates to a computer program that causes a computer to function so as to direct the line of sight of a user who is wearing a head-mounted display (hereinafter abbreviated as "HMD") on his/her head and is immersed in a three-dimensional virtual space toward a given direction in the three-dimensional virtual space.

A known HMD includes a type that is capable of presenting a three-dimensional virtual space image with a display or the like worn on the head of a user and positioned at the user's eye level. In particular, HMDs capable of displaying a 360-degree panoramic image in a three-dimensional virtual space are known. An HMD usually includes various sensors (for example, an acceleration sensor and an angular velocity sensor) to obtain posture data by measuring the posture of the main body of the user wearing the HMD. The HMD particularly measures the rotation angle of the user's head so that the direction of the line of sight on the panoramic image can be changed based on the information about the rotation angle. Specifically, when the user wearing the HMD tilts and turns his/her head, the HMD makes the direction of the line of sight on the 360-degree panoramic image change accordingly. The user immersed in the three-dimensional virtual space can cast his/her line of sight freely to any direction within the three-dimensional space by the movement of his/her head.

HMDs thus heighten the user's sense of immersion in the visual world and improve the level of entertainment. On the other hand, HMDs have difficulty with directing the user's line of sight in a scene where the developer wants the user to cast his/her line of sight to a particular point in the three-dimensional virtual space.

In Japanese Patent Application Laid-open No. Hei 11-265462, there is disclosed the related art that recommends a viewpoint to the user. Specifically, recommended vector information is set which specifies a viewpoint on an object image in a three-dimensional space that is to be recommended, and viewpoint information that is used to display the object image is determined based on the recommended vector information. The object image is thus displayed in a manner that reflects the intent of a person who has set the recommended vector information (Paragraph [0008]). A visual part (an arrow, a circle, or the like) is applicable here as a recommended vector (Paragraph [0033]). However, the disclosure of Japanese Patent Application Laid-open No. Hei 11-265462 is not directly related to the movement of a user's head wearing an HMD that is described above.

SUMMARY

An object of at least one embodiment of this disclosure is to accomplish a visual effect of directing a line of sight that is in conjunction with the movement of an HMD for a user who is wearing the HMD and is immersed in a three-dimensional virtual space by dynamically placing a guiding object at a point in the three-dimensional space that is appropriate for directing the user's line of sight effectively.

In order to solve the above-mentioned problem, according to at least one embodiment of this disclosure, there is provided a computer program for directing a line of sight by causing a computer that is connected to an HMD to function as: identification means for identifying a position of a target object in a three-dimensional virtual space; field-of-view determining means for determining a field of view that is based on the line of sight from a virtual camera, in relation to movement of the HMD; placement means for placing a guiding object, which follows the line of sight, in the three-dimensional virtual space at a point in the field of view that is determined based on a position of the virtual camera, a direction of the line of sight, and the position of the target object; and display means for generating and display a field-of-view image of the three-dimensional virtual space.

BRIEF DESCRIPTION OF THE DRAWINGS

FIG. 3 is a schematic diagram for illustrating a plurality of detection points virtually provided on the HMD to be detected by a position tracking camera of FIG. 1.

FIG. 4(a) and FIG. 4(b) are screen images of an example in which the computer program according to at least one embodiment of this disclosure is applied to an HMD game program and a three-dimensional virtual space is built.

FIG. 5 is a schematic diagram for illustrating the horizontal direction of the field of view in the three-dimensional virtual space.

FIG. 6B is a schematic diagram for illustrating in plan view another example of the placement of a guiding object in the three-dimensional virtual space.

FIG. 7A is a schematic diagram for stereoscopically illustrating an example of the placement of a guiding object in the three-dimensional virtual space.

FIG. 10 is a detailed processing flow chart for illustrating the information processing that is executed by the function blocks of FIG. 8.

DETAILED DESCRIPTION

Figure 1:
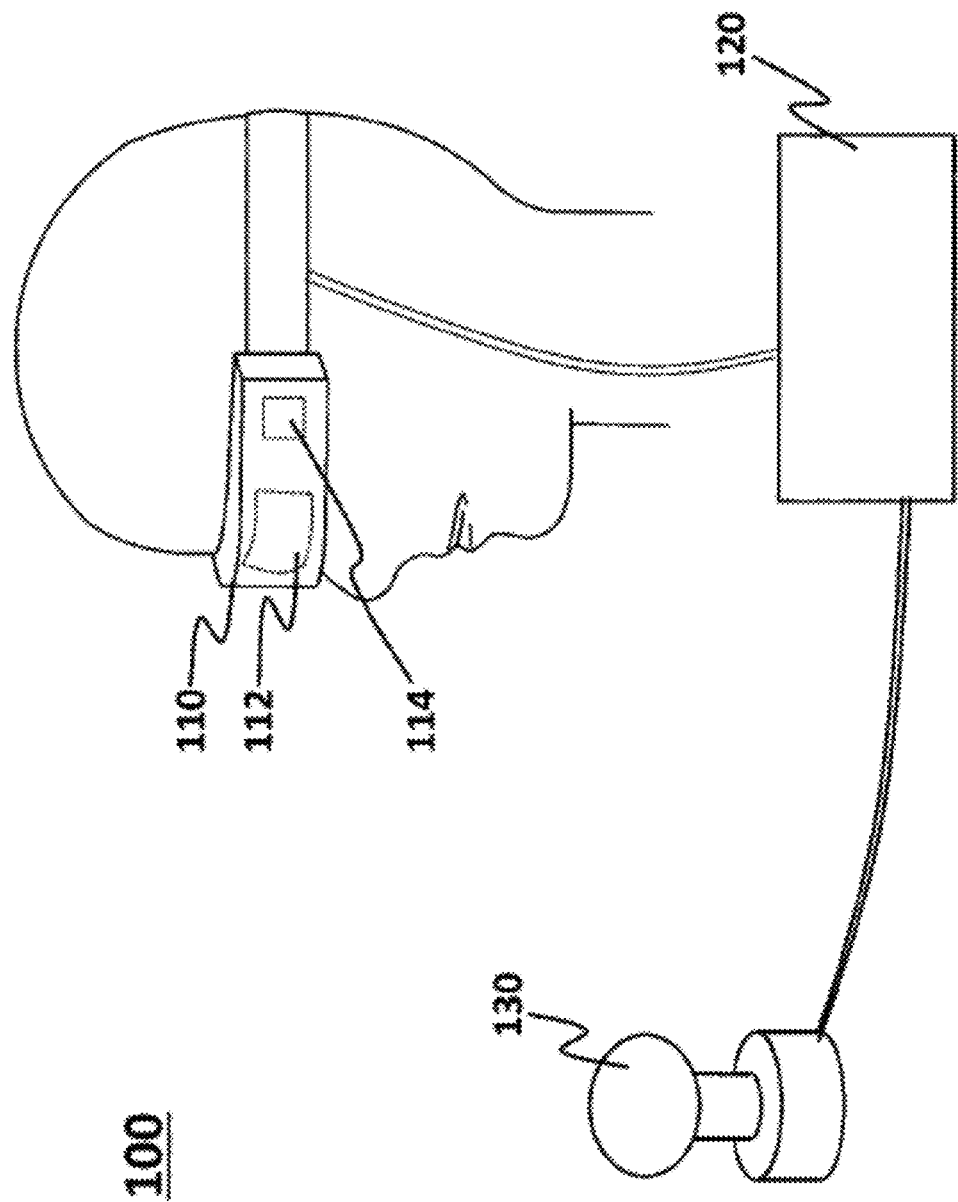
FIG. 1 is a schematic diagram for illustrating an HMD system with which a computer program according to at least one embodiment of this disclosure is carried out.

First, the specifics of at least one embodiment of this disclosure are listed and described. A computer program for directing a line of sight according to at least one embodiment of this disclosure is configured as described below.

(Item 1)

A computer program for directing a line of sight by causing a computer that is connected to an HMD to function as:

identification means for identifying a position of a target object in a three-dimensional virtual space;

field-of-view determining means for determining a field of view that is based on the line of sight from a virtual camera, in relation to movement of the HMD;

placement means for placing a guiding object, which follows the line of sight, in the three-dimensional virtual space at a point in the field of view that is determined based on a position of the virtual camera, a direction of the line of sight, and the position of the target object; and display means for generating and displaying a field-of-view image of the three-dimensional virtual space.

According to the computer program of this item, a guiding object that follows the line of sight can be placed dynamically in the field of view in a three-dimensional virtual space, thereby directing a user's line of sight appropriately and exerting a visual effect of directing a line of sight.

(Item 2)

A computer program according to Item 1, in which the placement means is further configured to place the guiding object in the three-dimensional virtual space at a point that is between the direction of the line of sight and a direction running from the virtual camera toward the target object, and that is at the same distance as a distance from the virtual camera to the target object.

According to the computer program of this item, the guiding object can be placed at a more appropriate point, and the user's line of sight can be led more effectively.

(Item 3)

A computer program according to Item 2, in which the placement means is further configured to place the guiding object on a circumference of a circle in the three-dimensional virtual space, the circle being centered about the position of the virtual camera and having as a radius the distance from the virtual camera to the target object, the circumference intersecting with the line of sight.

According to the computer program of this item, the guiding object can be placed at a more appropriate point to follow the line of sight in a more natural manner. This enables the user's line of sight to be directed effectively.

(Item 4)

A computer program according to any one of Items 1 to 3, in which the placement means is further configured to place the guiding object in a given direction around the target object when an angle that is formed between the direction of the line of sight and the direction of the target object with respect to the virtual camera is within a given first angle.

According to the computer program of this item, the placement of the guiding object can be changed dynamically when the guiding object approaches the target object, which enables the line of sight to be directed more effectively.

(Item 5)

A computer program according to Item 4, in which the given direction is a vertical direction in the three-dimensional virtual space.

According to the computer program of this item, the placement of the guiding object can be changed dynamically when the guiding object approaches the target object, which enables the line of sight to be directed more effectively.

(Item 6)

A computer program according to Item 4 or 5, in which the first angle is set from an angle range from 10 degrees to 30 degrees.

According to the computer program of this item, the placement of the guiding object can be changed more effectively by setting the angle range given above.

(Item 7)

A computer program according to any one of Items 1 to 6, in which the placement means is further configured to place the guiding object at a point that forms a given second angle from the direction of the line of sight toward the direction of the target object with respect to the position of the virtual camera.

According to the computer program of this item, the introduction of the second angle enables the line of sight to be directed more effectively through more appropriate placement of the guiding object.

(Item 8)

A computer program according to any one of Items 1 to 7, in which the guiding object has directivity toward the target object.

According to the computer program of this item, the guiding object has directivity in the three-dimensional space, thereby enabling the line of sight to be directed more effectively.

(Item 9)

A computer program according to any one of Items 1 to 8, in which the guiding object has a first characteristic, which depends on the angle formed between the direction of the line of sight and a direction of the target object with respect to the virtual camera.

According to the computer program of this item, the line of sight can be directed more effectively by employing a display mode in which a guiding object that has given characteristics is displayed dynamically.

(Item 10)

A computer program according to any one of Items 1 to 9, in which the guiding object has a given motion.

According to the computer program of this item, the introduction of a guiding object that has an animation effect enables the line of sight to be directed more effectively.

(Item 11)

A computer program according to Item 10, in which the given motion of the guiding object has a second characteristic, which depends on the angle formed between the direction of the line of sight and a direction of the target object with respect to the virtual camera.

According to the computer program of this item, introducing the guiding object in a motion that has given properties enables the line of sight to be directed more effectively.

A computer program for directing a line of sight according to at least one embodiment of this disclosure is described below with reference to the drawings. The same components are denoted by the same reference symbols throughout the drawings.

FIG. 1 is a schematic overall view of a head-mounted display (hereinafter abbreviated as "HMD") system 100, which uses an HMD and with which the computer program according to the at least one embodiment of this disclosure is carried out. As illustrated in FIG. 1, the HMD system 100 includes an HMD 110, a computer (control circuit unit) 120, and a position tracking camera (position sensor) 130.

The HMD 110 is provided with a display 112 and a sensor 114. The display 112 can be, but is not limited to, a non-transmissive display device configured to cover the sight of a user entirely, which allows the user to observe only a screen displayed on the display 112. The user wearing the non-transmissive HMD 110 loses all sights of the outside world. In this display mode, the user is thus completely immersed in a three-dimensional virtual space that is displayed on the display 112 by application software run on the computer 120.

The sensor 114 provided in the HMD 110 is fixed near the display 112. The sensor 114 includes at least one sensor selected out of a geomagnetic sensor, an acceleration sensor, and a tilt (angular velocity or gyro) sensor, and can detect through one or more of the included sensors various movements of the HMD 110 (the display 112) worn on the head of the user. In the case of an angular velocity sensor, in particular, the angular velocities of the HMD 110 about three axes are detected over time with the movement of the HMD 110 as illustrated in FIG. 2, which enables the HMD system 100 to determine changes with time of the angle (tilt) about each axis.

Figure 2:
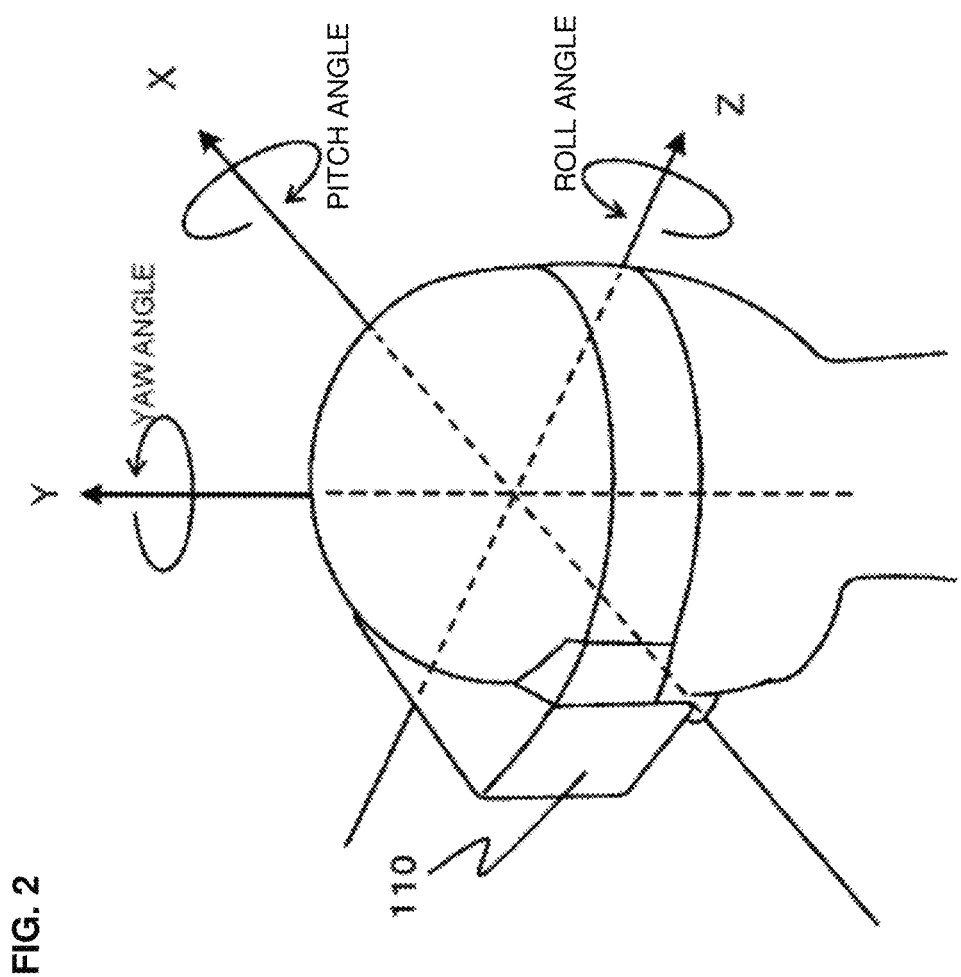
FIG. 2 is a diagram for illustrating a Cartesian coordinate system of a real space that is defined about the head of a user wearing the HMD of FIG. 1.

A specific description is given with reference to FIG. 2 on angle information data that can be detected by the tilt sensor. An X-Y-Z coordinate system is defined about the head of the user wearing the HMD as illustrated in FIG. 2. A vertical direction along which the user stands upright is set as the Y-axis, a direction that intersects at right angles with the Y-axis and connects the center of the display 112 to the user is set as the Z-axis, and an axis in a direction that intersects at right angles with the Y-axis and the Z-axis is set as the X-axis. The tilt sensor detects a tilt determined by angles about the respective axes, specifically, a yaw angle, which represents rotation about the Y-axis, a pitch angle, which represents rotation about the X-axis, and a roll angle, which represents rotation about the Z-axis. Changes with time of the detected tilt are used by a motion detecting unit 210 (FIG. 8) to determine angle (tilt) information data as field-of-view information. The angle information data is used to provide to the user wearing the HMD the user's line of sight in the three-dimensional virtual space and a field of view that is based on the user's line of sight.

Returning to FIG. 1, the computer 120 included in the HMD system 100 functions as a control circuit device for allowing the user to immerse himself/herself in the three-dimensional virtual space and act in response to the three-dimensional virtual space. The computer 120 includes apiece of hardware separate from the HMD 110 as illustrated in FIG. 1, in at least one embodiment. This piece of hardware can be a personal computer, or a server computer connected via a network, or other general-purpose computers. In other words, the computer 120 can be any computer that includes a CPU, a main memory, auxiliary storage, a transmission/reception unit, a display unit, and an input unit that are connected to one another by a bus (the components are not shown). Alternatively, the computer 120 is installed inside the HMD 110 as a field-of-view adjusting device, in at least one embodiment. The computer 120 in this case may implement all or a portion of functions of the field-of-view device. When the computer 120 implements a portion of the functions, the rest of the functions may be implemented by the HMD 110 or by a server computer (not shown) connected via a network.

The position tracking camera (position sensor) 130 included in the HMD system 100 is connected to the computer 120 in a manner that allows communication to and from each other, and has a function of tracking the position of the HMD 110. The position tracking camera 130 is implemented with the use of at least one element selected out of an infrared sensor and one or more optical cameras. The HMD system 100 is provided with the position tracking camera 130, and is capable of identifying and accurately associating the position of the HMD in real space and the virtual space position of a virtual camera/the immersed user in the three-dimensional virtual space with each other by detecting the position of the HMD on the user's head. Specifically, the position tracking camera 130 detects, over time, as the user moves, the real space positions of a plurality of detection points provided virtually on the HMD 110 to detect infrared rays, an example of which is illustrated in FIG. 3. The position tracking camera 130 is usable to detect infrared light emitted at locations on the HMD 110 indicated by the dots in FIG. 3, in some embodiments. The real space positions are communicatively coupled to the computer 120 to provide feedback about the real space positions. Positions in the three-dimensional virtual space that correspond to the movement of the HMD 110 are identified based on the changes with time of real space positions detected by the position tracking camera 130.

FIG. 4(a) and FIG. 4(b) are screen images of an example in which the computer program for directing a line of sight according to the embodiment of this disclosure is applied to an HMD game program and a three-dimensional virtual space is built. A field-of-view image is illustrated as a two-dimensional screen image in FIG. 4(a) and FIG. 4(b); but is displayed as a three-dimensional image to the user wearing the HMD. As illustrated in FIG. 4(a) and FIG. 4(b), a direction toward the center of the field of view photographed from the virtual camera is a direction of a line of sight, and virtual viewpoints 10 and 10' are indicated by dots in a central portion of the field-of-view image as an example. A board object 40, which is in the center of FIG. 4(a), and various other three-dimensional objects are arranged in the field-of-view image. Three-dimensional virtual space information about the arrangement of the three-dimensional objects which includes object information and position information is stored in a memory. The HMD program generates a field-of-view image in association with the three-dimensional virtual space information in response to a change in direction of a line of sight that is caused by the movement of the HMD. Objects arranged in a virtual space are not limited to three-dimensional objects throughout this specification.

A three-dimensional guiding object 20, which has the three-dimensional shape of an arrow (→), is placed and displayed in the three-dimensional space as illustrated in FIG. 4(a). The three-dimensional guiding object 20' is displayed in FIG. 4(b). The three-dimensional guiding object 20, which has directivity in the three-dimensional space, points toward a generally left and far-side direction in FIG. 4(a); and three-dimensional guiding object 20' points downward in FIG. 4(b). The guiding object 20 is placed dynamically by calculating the position and direction of the guiding object 20 in the three-dimensional virtual space so that the guiding object 20 follows the movement of the HMD, namely, the movement of the line of sight.

In FIG. 4(a), a target object toward which the line of sight is to be led is at a distant point and is not included in the field-of-view image yet. In other words, the guiding object 20 alone is displayed between the virtual viewpoint 10 and the target object (not shown). The presence of the guiding object 20 that is pointing toward the left and far-side direction enables the user to recognize that the target object can be identified in the three-dimensional space by facing leftward despite the absence of the target object from the field-of-view image as in FIG. 4(a). When the virtual viewpoint 10' is close enough to a target object as in FIG. 4(b), on the other hand, the guiding object 20 no longer needs to be displayed between the two because, in at least one embodiment, the user has an opportunity to recognize a target object 30. A guiding object 20' is displayed in a given direction around the target object 30 so as not to be placed between the virtual viewpoint 10' and the target object 30, in at least one embodiment. In the example of FIG. 4(*b*), the guiding object 20' that is pointing downward is placed at a given distance from the target object 30 in the vertical direction of the three-dimensional virtual space.

The guiding objects 20 and 20' may have characteristics that depend on an angle between the direction of the line of sight and the direction of the target object in relation to the virtual camera. In at least one embodiment, the size and color of the guiding object are based on this angle. For example, the three-dimensional guiding object (3D arrow object) is given a larger shape and/or a more noticeable color (e.g., red) when the direction of the line of sight is farther from the target object.

In addition, the guiding object may be displayed as animation on the HMD to give the guiding object a given motion. The motion here includes animation movement, for example, three-dimensional forward and back movement in small motions in a direction pointed by the 3D arrow object. However, the given motion is not limited thereto and can be any animation movement. The motion of the guiding object may have movement characteristics that depend on an angle between the direction of the line of sight and the direction of the target object in relation to the virtual camera. For example, the distance and speed of the forward and back movement may be determined based on this angle.

FIG. 5 is a diagram for illustrating the field of view from a virtual camera placed in a three-dimensional virtual space, in particular, the field of view in the horizontal direction. An X-Y-Z coordinate system is defined in the three-dimensional virtual space and a virtual camera 1 is placed at a point (Xcam, Ycam, Zcam) as illustrated in FIG. 5. The position coordinates are to be determined based on the position information that is detected by the position tracking camera 130 as illustrated in FIG. 3. The line of sight in the three-dimensional virtual space is to be determined based on the tilt of the sensor 114 as illustrated in FIG. 2. The virtual camera 1 has a given viewing angle, and the field of view is determined based on the line of sight and the viewing angle to generate a field-of-view image. Specifically, the field of view is defined so that a line of sight Lstd, which serves as a reference for the field of view from the virtual camera 1, corresponds to a given point (for example, the center point) of the field-of-view image. A viewing angle α in the horizontal direction (X-Z plane direction) is then defined with the line of sight Lstd as the center. Only the viewing angle α in the horizontal direction (X-Z plane direction) is illustrated in FIG. 5 and a viewing angle β in the vertical direction (Y-axis direction) is omitted for simplification. A field-of-view image of a three-dimensional virtual space as the ones illustrated in FIG. 4(*a*) and FIG. 4(*b*) is generated in this manner.

Figure 6A:
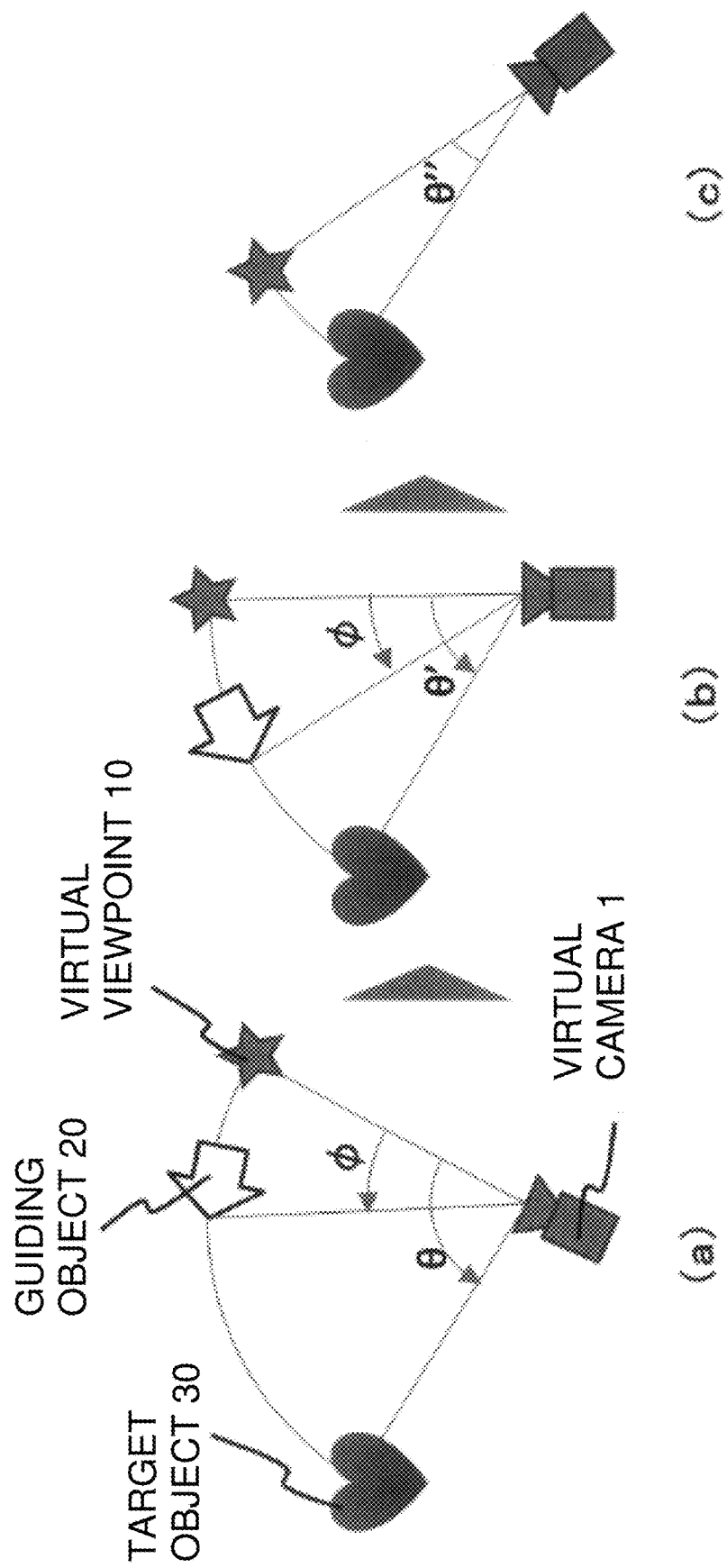
FIG. 6A is a schematic diagram for illustrating in plan view an example of the placement of a guiding object in the three-dimensional virtual space.

FIG. 6A(a) to FIG. 6A(c) and FIG. 6B(a) and FIG. 6B(b) are schematic plan views for illustrating the arrangement of the target object 30 in a three-dimensional virtual space. This description in applicable to displaying guiding objects 20 and 20' of FIG. 4(*a*) and FIG. 4(*b*) in the three-dimensional virtual space. As illustrated in FIG. 6A(a) and FIG. 6A(b), the placement of the guiding object 20, which follows the line of sight, can be determined based on the position of the virtual camera 1, the position of the virtual viewpoint 10 set along the line of sight, and the position of the target object 30. More exactly, in at least one embodiment, the guiding object 20 is placed at a point in the three-dimensional virtual space that is between the direction of the line of sight from the virtual camera 1 and the direction from the virtual camera 1 toward the target object 30. In addition, in at least one embodiment, the guiding object 20 is placed at the same distance as the distance from the virtual camera 1 to the target object. The virtual viewpoint 10, in at least one embodiment, is set virtually at a distance that is the same as the distance from the virtual camera 1 to the target object, in the direction of the line of sight from the virtual camera 1 as illustrated in FIG. 6A(a) and FIG. 6A(b).

The arrangement of FIG. 6A(a) and FIG. 6A(b) keep the guiding object at a point that forms a given angle cp from the direction of the line of sight toward the direction of the target object with respect to the position of the virtual camera 1. This makes the guiding object follow changes in the line of sight that are caused by the movement of the HMD by the user. In FIG. 6A(a), the virtual viewpoint 10 and the target object 30 are at a distance, identified by an angle θ, from each other in the three-dimensional virtual space. In other words, the target object 30 is placed with the angle θ set larger than the viewing angle of FIG. 5 in the horizontal direction. The target object 30 is therefore absent from the field-of-view image displayed on the HMD as illustrated in FIG. 4(*a*).

The user tilts his/her head (the HMD) as indicated by the displayed guiding object 20 of FIG. 6A(a), and moves the line of sight to the position of FIG. 6A(b). This reduces the angle between the direction of the line of sight and the target object 30 with respect to the virtual camera 1 from angle θ to angle θ '. The user continues to tilt his/her head (the HMD) further as indicated by the displayed guiding object 20 in the field-of-view image in an attempt to reduce angle θ '. However, when an angle θ " is smaller than a given angle as in FIG. 6A(c), e.g., the angle φ is larger than θ", and displaying the guiding object 20 ceases, in at least one embodiment. The guiding object in this case is placed, in at least one embodiment, in a given direction around the target object (for example, in the vertical direction at a given distance from the target object) as illustrated in FIG. 4(*b*).

Placing the guiding object 20 in a given direction around the target object 30 is triggered, in at least one embodiment, by the entering of θ" into a given angle of from 10 degrees to degrees. Experiments conducted by the inventors of this disclosure have revealed that the angle range of from 10 degrees to 30 degrees is suitable for bringing about dynamic visual effects. Any angle of from 10 degrees to 30 degrees can be set as the given angle.

The angle φ, which is a fixed angle in the description given above, is not limited thereto. Specifically, φ may be changed dynamically depending on the angle θ between the direction of the line of sight and the target object 30 with respect to the virtual camera 1, or may be changed based on the user's HMD tilting movement, for example, the angular velocity or acceleration of the movement.

The guiding object 20, which is placed at the same distance as the distance from the virtual camera 1 to the target object 30 in the description given above, is not limited thereto. However, as illustrated in FIG. 6B(a), a guiding object 20*a* too close to the virtual camera overlaps the virtual viewpoint 10, obstructs screen display, and therefore is not appropriate, in at least one embodiment. On the other hand, a guiding object 20*b* too far from the virtual camera is displayed small on the screen and is hard for the user to recognize visually. Determining the size of guiding objects 20*a*' and 20*b*' dynamically based on the distance from the virtual camera as in FIG. 6B(b) is therefore appropriate, and even a two-dimensional guiding object may be used in some cases.

Figure 7B:
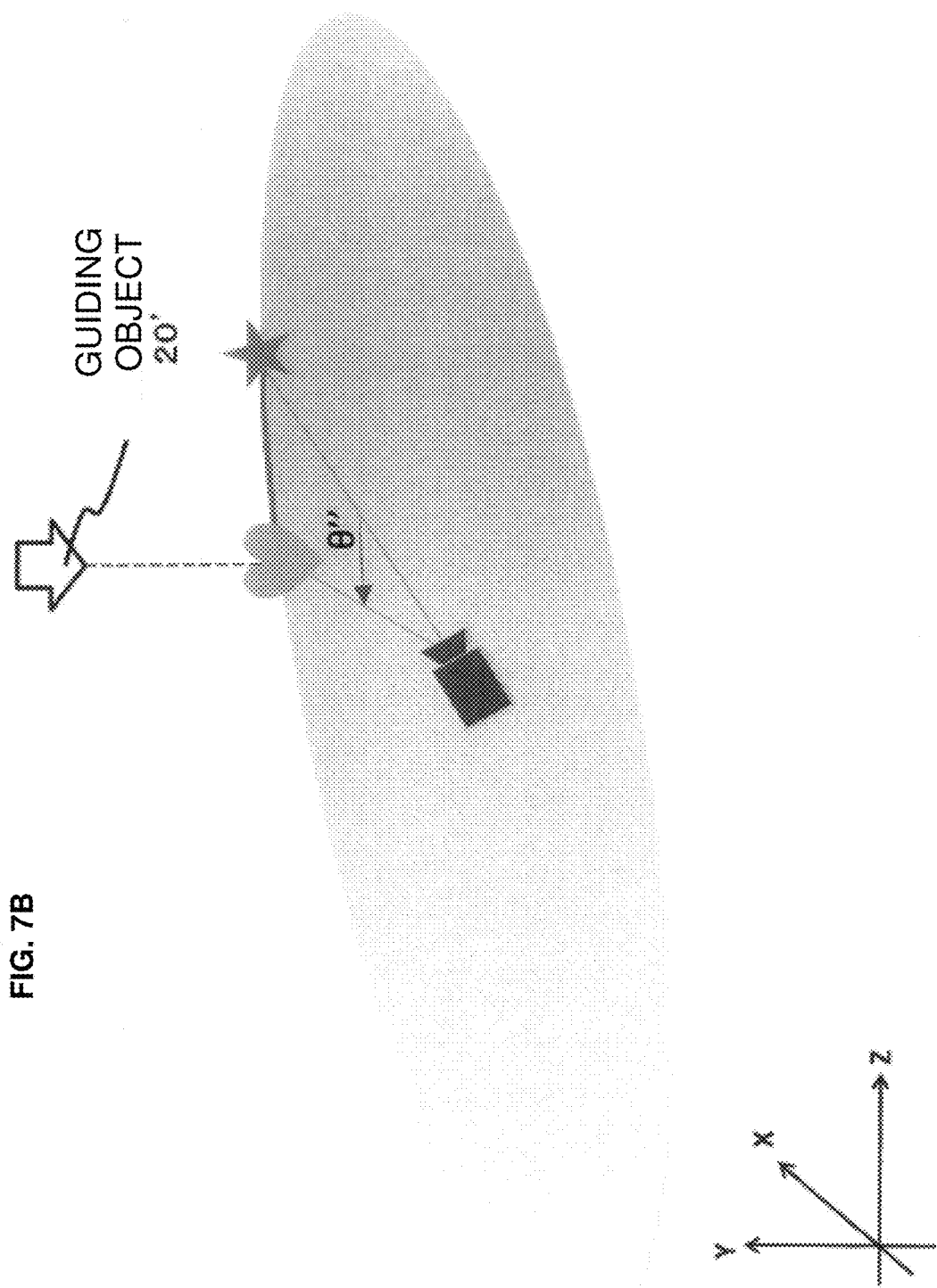
FIG. 7B is a schematic diagram for stereoscopically illustrating another example of the placement of a guiding object in the three-dimensional virtual space.

FIG. 7A and FIG. 7B are diagrams for stereoscopically illustrating the shifts from FIG. 6A(a) to FIG. 6A(c). FIG. 7A corresponds to FIG. 6A(a) and FIG. 4(*a*). FIG. 7B corresponds to FIG. 6A(c) and FIG. 4(*b*). The drawings are merely conceptual exemplification of at least one embodiment of this disclosure. The guiding object 20 and the target object 30 are placed in a space as three-dimensional objects in actuality.

In FIG. 7A, the guiding object 20 is placed on the circumference of a circular plane in the three-dimensional virtual space. Specifically, the guiding object 20 is placed on a circumference C of a circle centered about the position of the virtual camera 1 and having a radius equal to the distance from the virtual camera 1 to the target object 30 that intersects with the line of sight (the circumference C has the virtual viewpoint 10). With the guiding object 20 placed in this manner, the guiding object 20 smoothly moves three dimensionally by following the line of sight. In FIG. 7B, the angle θ" between the virtual viewpoint and the target object has entered the given angle range, and the guiding object 20' is therefore placed, as an example, in the vertical direction of the three-dimensional virtual space at a given distance from the target object. However, the guiding object 20' can be placed in any direction around the target object as long as the guiding object does not obstruct the view. In light of this, the placement of the guiding object 20' may be determined in relation to another object placed around the target object.

Figure 8:
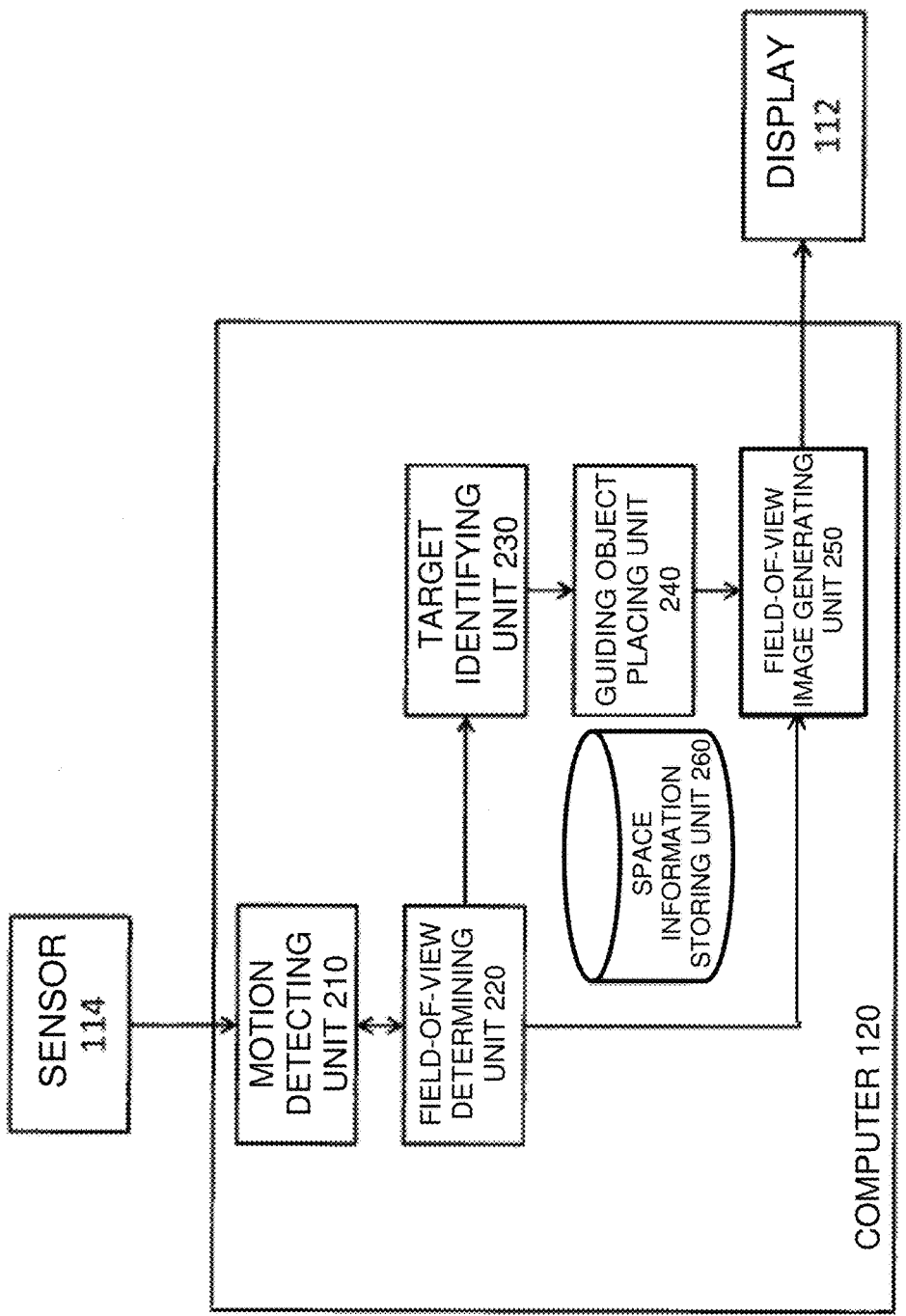
FIG. 8 is a diagram of main function blocks that are implemented by a computer according to at least one embodiment of this disclosure.

The following description is given with reference to FIG. 8 and the subsequent figures on information processing that is executed by a computer using the computer program for directing a line of sight according to the embodiment of this disclosure. FIG. 8 is a block diagram for illustrating the configuration of main functions of components that are implemented by the computer (control circuit unit) 120 in order to carryout the computer program for directing a line of sight according to the embodiment of this disclosure. The computer 120 in at least one embodiment of this disclosure functions as means of the components of FIG. 8. In other words, the computer 120 receives an input from the sensor 114 and the position tracking sensor 130, processes the input, and outputs the result to the HMD (display) 112. The output here includes generating and displaying a field-of-view image of a three-dimensional virtual space.

The computer 120 specifically includes the motion detecting unit 210, a field-of-view determining unit 220, a target identifying unit 230, a guiding object placing unit 240, and a field-of-view image generating unit 250 as components. The computer 120 is also configured so as to process various types of information by, for example, referring to and updating various tables of, among others, a space information storing unit 260 in which virtual space information is stored.

The motion detecting unit 210 is configured to determine various types of motion data of the HMD 110 worn on the head of the user, based on an input of motion information measured by the sensor 114. The motion detecting unit 210 in at least one embodiment of this disclosure particularly determines tilt (angle) information that is detected over time by the tilt sensor (gyro sensor) 114 provided in the HMD, and position information that is detected over time by the position sensor (position tracking camera) 130, which is capable of detecting the HMD.

The field-of-view determining unit 220 is configured to determine a field of view based on the line of sight from the virtual camera, in relation to the movement of the HMD. Specifically, the field-of-view determining unit 220 determines the position and direction of the virtual camera placed in the three-dimensional virtual space and the field of view from the virtual camera as illustrated in FIG. 5, in at least one embodiment. The field of view determining unit 220 determination is based on the three-dimensional virtual space information stored in the space information storing unit 260, and on the tilt information and position information detected by the motion detecting unit 210. The position sensor 130 can be optional and, in the case where the position sensor is not used, the virtual camera is configured so as to be always at the center point of the three-dimensional virtual space.

The target identifying unit 230 is configured to identify the position of a target object placed in the three-dimensional virtual space, based on the three-dimensional virtual space information stored in the space information storing unit 260. The target object is a target toward which the line of sight is to be led. In at least one embodiment, target objects in a game and the order of directing the line of sight to the target objects are set in advance in a manner that fits the scenario of how the game progresses, or the like.

The guiding object placing unit 240 is configured to place a three-dimensional guiding object at a point in the field of view in a three-dimensional virtual space that is determined based on the position of the virtual camera, the direction of the line of sight, and the position of a target object. This allows the guiding object to follow the movement of the line of sight.

The field-of-view image generating unit 250 is configured to generate, with the use of the virtual space information, a field-of-view image to be displayed on the HMD which is a part of a 360-degree panoramic image and which is an image of the field of view determined by the field-of-view determining unit 220. The field-of-view image displayed on the HMD can be made to simulate a three-dimensional image to the user by generating a two-dimensional image for the left eye and a two-dimensional image for the right eye, and superimposing the two images in the HMD.

The components illustrated as function blocks that execute various types of processing in FIG. 8 can be built from hardware such as a CPU, a memory, and other integrated circuits, and can also be implemented by executing software such as various programs loaded onto a memory. One of ordinary skill in the art would understand that the illustrated function blocks can be implemented by hardware, or software, or a combination of hardware and software.

Figure 9:
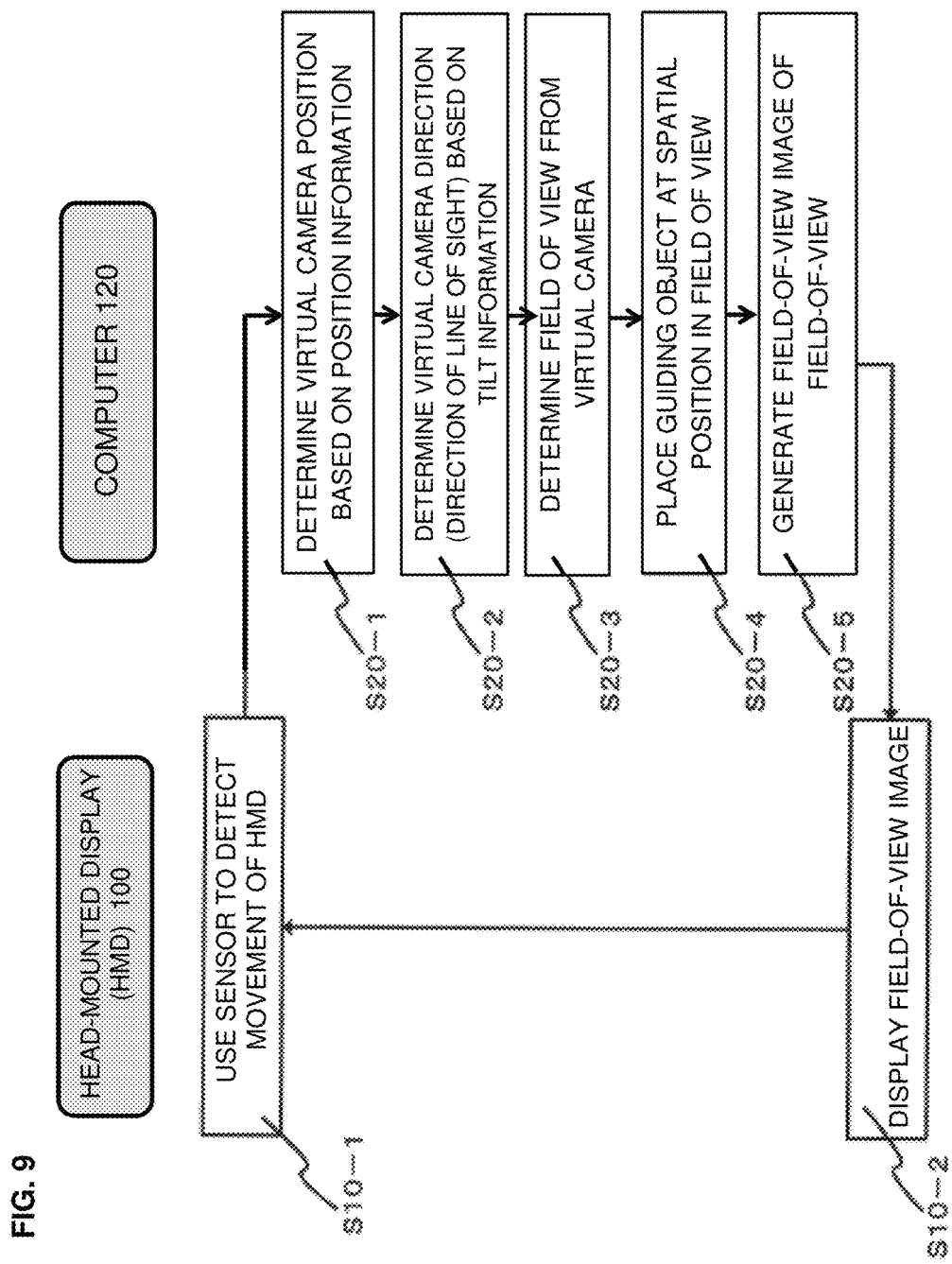
FIG. 9 is a schematic processing flow chart for illustrating information processing that is executed by the function blocks of FIG. 8.

The flow of processing that is related to directing a line of sight according to the embodiment of this disclosure is described next with reference to FIG. 8 and FIG. 9. This information processing is executed through interaction between the HMD 110 and the computer 120 as illustrated in FIG. 9, in at least one embodiment. FIG. 9 is a schematic processing flow of a series of steps in which a field-of-view image is generated and displayed by prompting the user to tilt and move the HMD and to change the field of view in a three-dimensional virtual space as led by directing of the line of sight. FIG. 10 is a detailed processing flow about one of processing steps of FIG. 9 that is processing of placing the guiding object (Step S20-4).

In FIG. 9, the HMD 110 repeatedly detects the movement of the user's head with the use of the sensor 114 as in Step S10-1. The computer 120 responds to the detection by using the motion detecting unit 210 in Step S20-1 to determine the position of a virtual camera that is placed in the three-dimensional virtual space, based on the position information about the position of the HMD. In Step S20-2, the motion detecting unit 210 also determines the direction of the virtual camera, namely, the line of sight, so that the line of sight matches the movement of the HMD (the tilt information). In the subsequent Step S20-3, the field-of-view determining unit 220 determines the field of view based on the line of sight from the virtual camera and on the given viewing angle, e.g., FIG. 5, of the virtual camera.

In Step S20-4, the target identifying unit 230 identifies a target object placed in the three-dimensional space. The guiding object placing unit 240 places in Step S20-4 a three-dimensional guiding object that is to be directed to the target object, at a spatial position in the field of view. Details of Step S20-4 are described later with reference to FIG. 10. In at least one embodiment, step S20-3 is performed simultaneously with step S20-4.

In Step S20-5, the field-of-view image generating unit 250 generates a field-of-view image of the field of view that contains the guiding object, to be displayed on the HMD 112. Specifically, the field-of-view image generating unit 250 uses the virtual space information stored in the space information storing unit 260 to generate a field-of-view image of the field of view. In the next Step S10-2, the field-of-view image generated in Step S20-5 is displayed on the display 112 of the HMD.

Step S10-1, Steps S20-1 to S20-5, and Step S10-2 described above are a series of steps of a processing routine, and are executed repeatedly while the application software is running.

FIG. 10 is a chart for illustrating the detailed flow of Step S20-4. In Step S200-1, the target identifying unit 230 identifies the position of a target object in the three-dimensional virtual space. In at least one embodiment target objects are set in advance, along with an order in which the target objects are selected as a current target, and to store the set target objects and order in a memory, e.g., as a table. The guiding object placing unit 240 is the unit that executes the subsequent steps.

In Step S200-2, the angle θ from the direction of the line of sight toward the target object direction is determined with respect to the position of the virtual camera. In Step S200-3, whether θ is larger than a given angle ω is determined in order to determine the placement of a guiding object. When the answer is yes, the guiding object placing unit 240 proceeds to Step S200-4 to determine a three-dimensional guiding object that follows the line of sight, based on the position of the virtual camera, the direction of the line of sight, and the position of the target object. When the answer is no, on the other hand, the guiding object placing unit 240 proceeds to Step S200-6 to place the guiding object in a given direction around the target object through a guiding object placement change.

More specifically, the circumference of a circle centered about the position of the virtual camera and having as a radius the distance to the target object that intersects with the line of sight (the circumference C of FIG. 7A) is determined in Step S200-4. In Step S200-5, a point on the determined circumference that forms an angle φ from the direction of the line of sight to the target object direction is determined as a point where the guiding object is placed in the field-of-view area. Next, the three-dimensional guiding object is placed at the determined guiding object placement point in Step S200-7. In this step, the guiding object, which has three-dimensional directivity, is placed so as to be directed toward the target object direction.

In Step S200-6, on the other hand, a place around the target object that is at a given distance from the target object in a given direction is determined as the guiding object placement point. For example, a point at a given distance from the target object in the vertical direction of the three-dimensional virtual space is determined as the guiding object placement point, e.g., as illustrated in FIG. 7B. Next, the three-dimensional guiding object is placed at the determined guiding object placement point in Step S200-7 in the manner described above.

With the computer program for directing a line of sight according to at least one embodiment of this disclosure, a three-dimensional guiding object that follows the line of sight can be placed dynamically in the field of view in a three-dimensional virtual space, thereby directing the user's line of sight appropriately and exerting visual effects of directing a line of sight. The three-dimensional guiding object, which has three-dimensional directivity, enables the line of sight to be directed more effectively particularly when configured to have various characteristics. In addition, the directing of the line of sight can have more dynamic visual effects by changing the field of view when a given angle condition is met.

The computer program for directing a line of sight according to the embodiment of this disclosure has been described above with some examples, but this disclosure is not limited to the above-mentioned embodiment. It is to be understood by a person skilled in the art that various modifications can be made to the embodiment as long as the modifications do not deviate from the spirit and scope of this disclosure described above.

The invention claimed is:

1. A non-transitory computer readable medium for storing instructions for directing a line of sight by causing a computer that is connected to a head-mounted display to:
   identify a position of a target object in a three-dimensional virtual space;
   determine a field of view based on the line of sight, in relation to movement of the head-mounted display, wherein the line of sight is determined based on a viewing angle of a virtual camera;
   place a guiding object, which follows the line of sight, in the three-dimensional virtual space at a point in the field of view that is determined based on a position of the virtual camera, a direction of the line of sight, and the position of the target object; and
   generate instructions for displaying a field-of-view image of the three-dimensional virtual space including the guiding object, wherein
   the guiding object is placed, in a first orientation, in the three-dimensional virtual space at a point between the direction of the line of sight and a direction extending from the virtual camera toward the position of the target object, and
   an orientation of the guiding object is changed to a second orientation, different from the first orientation, in response to an angle between the virtual camera and the target object being within a predetermined angle range.

2. A non-transitory computer readable medium according to claim 1, wherein the instructions are usable for directing the computer to place the guiding object in a given direction around the position of the target object when an angle between the direction of the line of sight and the position of the target object with respect to the virtual camera is less than or equal to a predetermined angle.

3. A non-transitory computer readable medium according to claim 2, wherein the given direction is a vertical direction in the three-dimensional virtual space.

4. A non-transitory computer readable medium according to claim 2, wherein the predetermined angle is set from an angle range from 10 degrees to 30 degrees.

5. A non-transitory computer readable medium according to claim 1, wherein instructions are usable for directing the computer to place the guiding object at a point that forms a predetermined angle between the direction of the line of sight and the position of the target object.

6. A non-transitory computer readable medium according to claim 1, wherein instructions are usable for directing the computer to place the guiding object having directivity toward the position of the target object.

7. A non-transitory computer readable medium according to claim 1, wherein instructions are usable for directing the computer to place the guiding object having a first characteristic based on an angle between the direction of the line of sight and the position of the target object.

8. A non-transitory computer readable medium according to claim 1, wherein instructions are usable for directing the computer to generate instructions for displaying the guiding object having a given motion.

9. A non-transitory computer readable medium according to claim 8, wherein instructions are usable for directing the computer to generate instructions for displaying the given motion of the guiding object having a second characteristic based on an angle between the direction of the line of sight and the position of the target object.

10. A non-transitory computer readable medium according to claim 1, wherein the guiding object has a first animation when the guiding object has the first orientation, a second animation when the guiding object has the second orientation, and the second animation is different from the first animation.

11. A non-transitory computer readable medium according to claim 1, wherein the first orientation has a first angular relationship with a plane passing through the line of sight, and the second orientation has a second angular relationship with the plane passing through the line of sight.

12. A non-transitory computer readable medium according to claim 1, wherein
the point between the direction of the line of sight and a direction extending from the virtual camera toward the position of the target object is a same distance from the virtual camera as the target object,
the guiding object is placed in the first orientation on a circumference of a circle in the three-dimensional virtual space, the circle being centered about the position of the virtual camera and having as a radius equal to the distance from the virtual camera to the target object, the circumference intersecting with the line of sight, so that the guiding object points in the direction of the target object.

13. A method of directing a line of sight, the method comprising:
identifying a position of a target object in a three-dimensional virtual space;
determining a field of view based on the line of sight, in relation to movement of the head-mounted display, wherein the line of sight is determined based on a viewing angle of a virtual camera;
placing a guiding object, which follows the line of sight, in the three-dimensional virtual space at a point in the field of view that is determined based on a position of the virtual camera, a direction of the line of sight, and the position of the target object; and
generating instructions for displaying a field-of-view image of the three-dimensional virtual space including the guiding object,
wherein:
at least one of the above operations is performed by a computer connected to a head mounted display,
the guiding object is placed, in a first orientation, in the three-dimensional virtual space at a point between the direction of the line of sight and a direction extending from the virtual camera toward the position of the target object, and
an orientation of the guiding object is changed to a second orientation, different from the first orientation, in response to an angle between the virtual camera and the target object being within a predetermined angle range.

14. A method according to claim 13, wherein the guiding object has a first animation when the guiding object has the first orientation, a second animation when the guiding object has the second orientation, and the second animation is different from the first animation.

15. A method according to claim 13, wherein the first orientation has a first angular relationship with a plane passing through the line of sight, and the second orientation has a second angular relationship with the plane passing through the line of sight.

16. A system for directing a line of sight, the system comprising:
a head-mounted display; and
a computer connected to the head-mounted display, wherein the computer is configured to execute instructions to:
identify a position of a target object in a three-dimensional virtual space;
determine a field of view based on the line of sight, in relation to movement of the head-mounted display, wherein the line of sight is determined based on a viewing angle of a virtual camera;
place a guiding object, which follows the line of sight, in the three-dimensional virtual space at a point in the field of view that is determined based on a position of the virtual camera, a direction of the line of sight, and the position of the target object; and
generate instructions for displaying a field-of-view image of the three-dimensional virtual space including the guiding object, wherein
the guiding object is placed, in a first orientation, in the three-dimensional virtual space at a point between the direction of the line of sight and a direction extending from the virtual camera toward the position of the target object, and
an orientation of the guiding object is changed to a second orientation, different from the first orientation, in response to an angle between the virtual camera and the target object being within a predetermined angle range.

17. A system according to claim 16, wherein the guiding object has a first animation when the guiding object has the first orientation, a second animation when the guiding object has the second orientation, and the second animation is different from the first animation.

18. A system according to claim 16, wherein the first orientation has a first angular relationship with a plane passing through the line of sight, and the second orientation has a second angular relationship with the plane passing through the line of sight.

* * * * *